United States Patent [19]

Anderson

[11] 4,448,434
[45] May 15, 1984

[54] COLLAPSIBLE HAND TRUCK

[76] Inventor: Milan B. Anderson, P.O. Box 178088, San Diego, Calif. 92117

[21] Appl. No.: 335,875

[22] Filed: Dec. 30, 1981

[51] Int. Cl.³ .............................................. B62B 1/12
[52] U.S. Cl. ........................................ 280/40; 224/915; 248/98; 280/654; 280/655; 280/47.28; 280/47.29
[58] Field of Search ............... 280/654, 655, 651, 652, 280/47.13 R, 47.17, 47.18, 47.19, 47.24, 40, 645, 47.28, 47.27; 248/98, 101; 224/DIG. 915, DIG. 922, 42.45 R

[56] References Cited

U.S. PATENT DOCUMENTS

| | | | |
|---|---|---|---|
| 2,918,297 | 12/1959 | Peters | 224/915 |
| 2,965,344 | 12/1960 | Baker | 224/42.45 R |
| 3,041,026 | 6/1962 | Wilson | 248/98 |
| 3,168,329 | 2/1965 | Goldschmidt | 280/651 |
| 3,659,867 | 5/1972 | Curry | 280/47.27 |
| 4,315,632 | 2/1982 | Taylor | 280/40 |

FOREIGN PATENT DOCUMENTS 2334550 7/1977 France .............................. 280/652

Primary Examiner—Joseph F. Peters, Jr.
Assistant Examiner—Joseph McCarthy
Attorney, Agent, or Firm—Frank D. Gilliam

[57] ABSTRACT

The collapsible hand truck disclosed includes a pair of spaced-apart, segmented, upright frame members, their segments each being pivotly connected to a "U" bracket; The upright frame members each having a handle and a wheel at opposite ends; The handles and wheels extending in the same direction from the upright members; A load-carrying bracket is rotatably connected between the upright members near the handle ends; Brace members are rotatably connected to the upright members between the "U" bracket and wheel ends; and A weight support bracket is rotatably and pivotly connected between the upright frame members and when in an operable position extends outwardly from the upright frame members on the opposite side from the handles and wheels.

9 Claims, 3 Drawing Figures

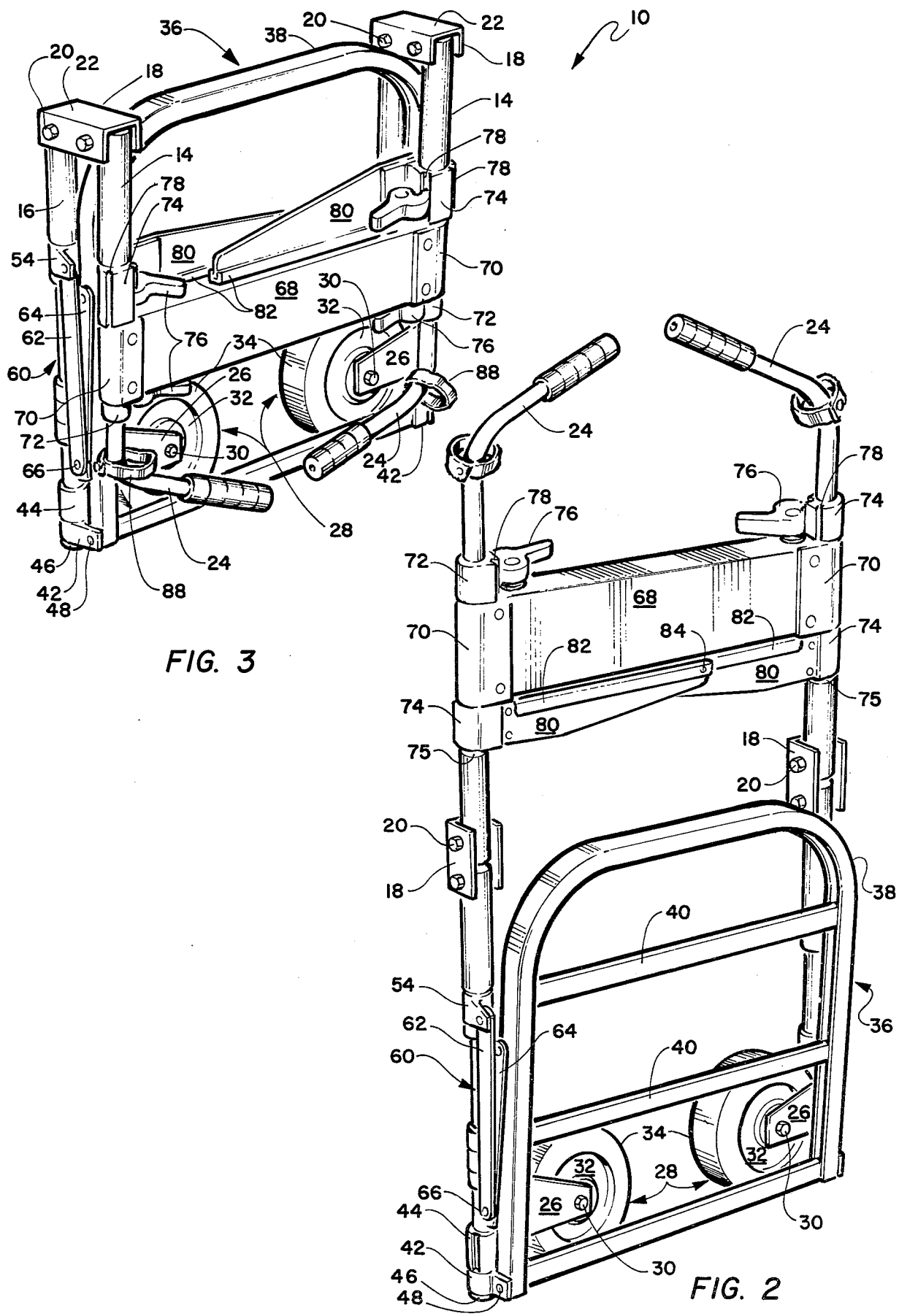

COLLAPSIBLE HAND TRUCK

BACKGROUND OF THE INVENTION

1. Field of Invention

This invention relates to wheeled carriers and, more particularly, to such carriers that are collapsible to a minimum dimension for hand carrying and storing.

2. Prior Art

The problem of providing a sturdy, collapsible hand cart for transporting weighted items, such as fishing equipment, boat engines or the like, to and from boats, that can be collapsed or folded into a small package for storage or transporting in an automobile, airplane or boat is of long-standing, and many devices of the prior art provide for solutions of one type or another.

U.S. Pat. No. 2,884,257 teaches a foldable hand truck for transporting and displaying items such as boat engines. The hand truck, when in a folded position, is not confined within the dimensions of the frame members, as the handles and wheels extend well beyond the frame area and no foldable weight-supporting shelf is provided.

U.S. Pat. No. 3,241,852 teaches a folding hand truck for transporting boat engines and the like. Although this hand truck folds to a small package and a foldable weight-supporting shelf is provided, it takes excessive time to prepare the truck for use or for storage. The truck must be dismantled in part for storage and reassembled for use. The loss or breakage of its removable elements over a long period of time appears certain.

Additional examples of folding hand trucks or the like are taught by U.S. Pat. Nos. 1,409,838; 2,507,234; 2,745,643; 3,014,760; 3,400,942; 3,229,990 and 3,947,054.

SUMMARY OF THE INVENTION

To obtain its objects, the invention provides a foldable hand truck, substantially rectangular, constructed from rigid tubing, having a pair of wheels positioned on adjacent corners.

An object of the invention is to provide a collapsible hand truck that can be collapsed into a relatively small structure for storage and transport without the temporary removal of any of its parts or elements.

Another object of this invention is to provide a sturdy, collapsible hand truck that can be collapsed for storage or deployed from a collapsed condition to a use condition in a minimum amount of time.

Another object of this invention is to provide a sturdy, collapsible hand truck that is simple to collapse and deploy from a collapsed condition to a use condition.

A still further object of this invention is to provide a hand truck capable of supporting relatively heavy loads, both at an elevated position adjacent the handles, such as boat engines, and on a lower weight-supporting platform.

A yet further object of the invention is to provide a collapsible hand truck which, when in a collapsed condition, forms a compact package, substantially rectangular.

The foregoing and other objects will best be understood from the following description, read in connection with the drawings of one preferred embodiment of the invention, in which:

BRIEF DESCRIPTION OF THE DRAWINGS

FIG. 2 is a perspective view of the folding hand truck of FIG. 1 in a partially folded or colapsed condition; and FIG. 3 is a perspective view of the folding hand truck of FIG. 1 in a completely folded or collapsed condition.

DETAILED DESCRIPTION OF THE PREFERRED EMBODIMENT

Figure 1:
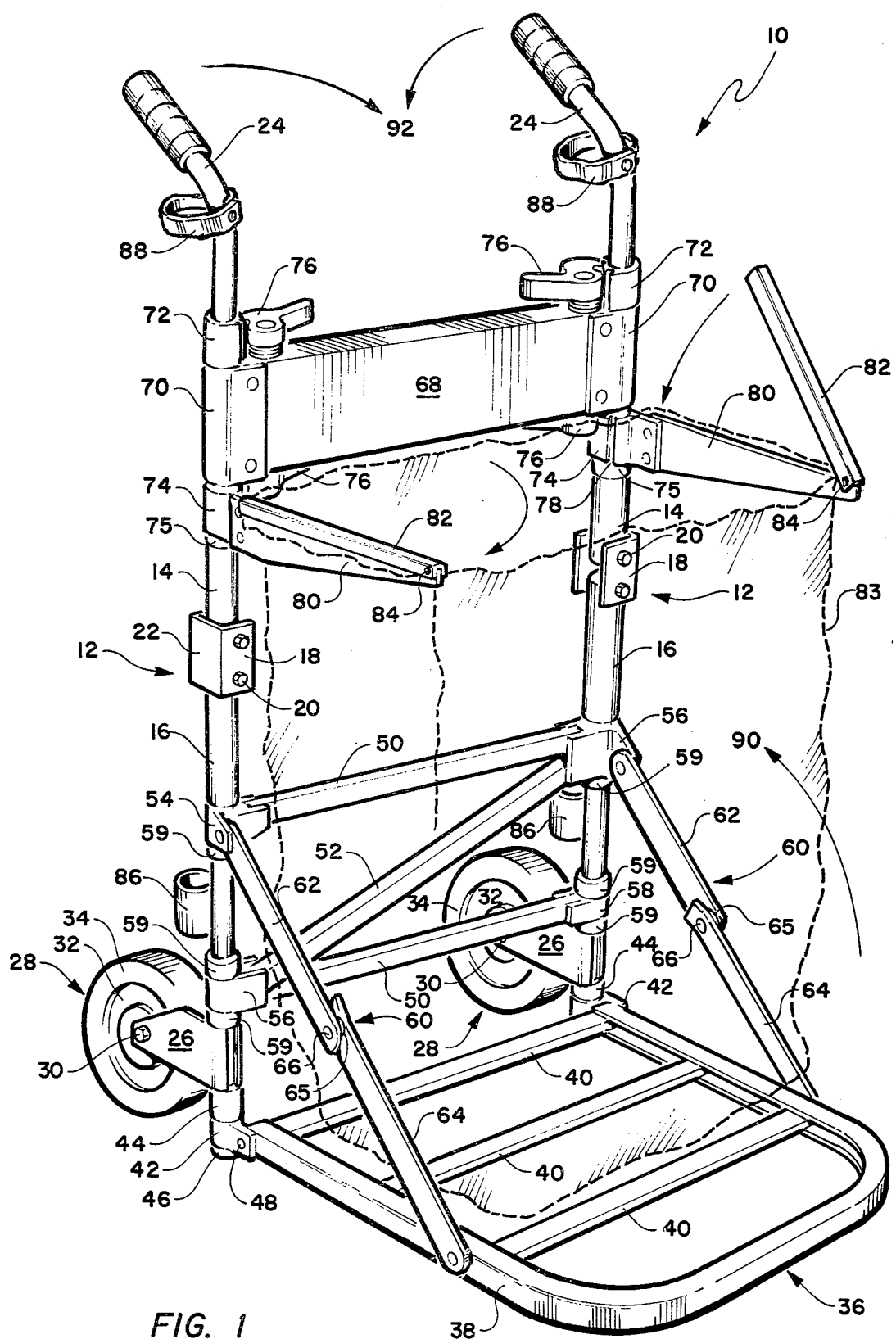
FIG. 1 is a perspective view of the folding hand truck as it appears in an unfolded standing position ready for use.

Like reference numberals are used throughout the drawing figures and specifications to denote the same or like part or element.

Referring now to the figures, the foldable cart 10 is seen to be an assembly of several foldable parts including right and left tubular side member 12, comprising upper and lower portions 14,16 respectively. The upper and lower portions 14,16 are interconnected by a "U" shaped connector 18. The "U" connector is pivotly attached to the upper and lower portions 14,16 by bolts 20 which pass through bores in the portions 14,16 (not shown) and are secured therethrough. As can be seen in FIG. 1, the open portion of the "U" connectors face inward toward each other, thereby locking pivotal movement of the upper and lower portions 14,16 in their extended configuration. The tubular upper and lower portions 14,16 respectively are positioned away from the back wall 22 of the "U" connector so that they can pivot relative to the bracket back wall when rotated to their FIG. 2 position, hereinafter explained in more detail.

At the upper ends of the upper portions of the side members, handles 24 are provided. The handles ends include convenient grip means 26, constructed of resilient material which closely resembles bicycle or motorcycle-type handle grips. Near the low end of the lower portions 16 of the side members 12, wheel brackets 26 are attached. Each wheel bracket 26 carries a wheel 28 therein. An axle 30, passing through the bracket and wheel, holds the wheel to the bracket and allows the wheel to rotate relative thereto. The wheel typically will have a metal hub or center 32 and the resilient member 34 positioned on the hub or center 32. Typical bushing-type bearings within the hub adjacent the axle (not shown) allow for ease of wheel rotation when the cart is being operated.

Positioned on the extreme lower end of the lower portion 16 of the side members 12 is a weight-supporting shelf 36. The shelf 36 includes an outer periphery member 38, which extends from the lower ends of the lower portion 16 of the frame members 12 outward and forms the outer surface of the shelf and cross-members 40, which are attached to the outer shelf periphery member 38 to provide the shelf support and an open floor. The shelf 36 attaches to the lower portion 16 of the right and left side members through a bracket 42. The bracket 42 is freely or rotatably connected to the side members 16 and held captive thereon by bushings 44,46 which are fixedly attached to the side members. The shelf outer periphery member 38 is pivotly attached to the shelf bracket 42 by a pivot 48. The pivot 48 may be of any convenient type, such as but not limited to a pin or smooth bolt passing through bores in the bracket and periphery member and retained therein by an enlarged head member and/or cotter pins or nut members, not shown. Thus, the shelf can be folded upward about the pivots 48 toward the handles and the tubular side members can be rotated relative thereto.

A brace member comprising a pair of bars 50 and a diagonal member 52 provide support to the right and left side members 12 and a back support for objects transported on the shelf 36. The brace members are rotatably attached to the side members 12 through brackets 54, 56 and 58. The brackets are held in place by bushings 59 fixedly attached to the lower portion 16 of side members 12. Brackets 54,56 are pivotly attached to one end of a two-piece brace 60. The opposite end of the two-piece brace is pivotly connected to the sides of the outer periphery shelf member 38. The two-pieces 62,64 of the brace 60 are loosely pivotly connected at connection 66. The connection 66 further includes a Belville washer-type spring 65 which biases the loosely connected pieces together at connection 66. The cross-sectional configuration of the pieces 62,64 is substantially in the shape of a "U" or "V" spread at their open ends, which allows the pieces to nest one within the other when on a common plane. Thus, when the two pieces are biased together by the Belville spring washer, the pieces will not be able to rotate relative to each other, which results in a rigid brace between the shelf and tubular side members 12. For storage wherein the shelf must be folded upwward, the two pieces are forced apart against the bias of the Belville spring washer out of their nested relationship and allowed to have relative movement as the shelf is pivoted upwardly adjacent the side members.

Positioned between the handles 24 and the "U" shaped connector 18 is a weight supporting cross-member 68. Constructed of hardwood, metal, plastic or the like suitable for supporting a conventional outboard boat engine or motor or the like clamped thereto. The cross-member 68 is pivotly attached to the upper portions 14 of the tubular side members by end caps 70, bolted, screwed or riveted thereto. The cross-member supported 68 is held in place by upper bushings 72 and lower bushings 74. The upper bushings 72 are fixedly attached to upper portion 14 of the tubular side members, and the lower bushings are fixed in elevation along portion 14 by a shoulder 75, formed between the different diameters of section 14 of left and right tubular members 12 or by an internal bushing (not shown) and rotates freely relative thereto. A pair of lock members 76 are rotatably carried on the upper surface of cross-member 68. The locking members 76 have springs biased in a locked position and mate with a vertical groove 78 (see FIG. 2) in bushing 72. The lower bushings 74 carry an outward extending bracket member 80. Each bracket member 80 carries an elongated "U" member 82 which is pivotly attached to the bracket 80 inboard of its distal end at pivot 84. The "U" member 82 nests over the upper surface of the bracket 80 in a nested position as shown on the left hand side of FIG. 1 and rotates relative thereto when unnested, as shown on the right hand side of FIG. 1. As can be seen, a soft container such as a sack or bag 83 (shown in phantom) can be positioned over the bracket members 80 and locked thereto by members 82. A pair of lock members 76 are also carried on the bottom surface of cross-member 68 in the same manner of the upper surface locking members 68. These lower locking members engage one of two grooves 78 in bushings 74 to lock the brackets 80 in a folded, non-extended position (see FIGS. 2 and 3) and an extended position (see FIG. 1).

Cups 86 are fixedly attaching to the lower portion 16 of the side members 12 on the same side and adjacent to the wheels 28. Straps 88 are fixedly secured to the upper portion 14 of the side members 12 on the handle extended/wheel side of the tubular side members in alignment with the upper open surface of the cup 86. The straps 88 form a continuous loop when the ends are secured together by a snap, velcro means or the like and are open when unsnapped. The cup and strap combination is convenient for carrying elongated members such as fishing poles or the like.

The construction of the various constituent parts, not hereinbefore discussed, may be of metal or the like; aluminum is preferable because of its strength-to-weight ratio.

When collapsing or folding the hand truck for storage from its FIG. 1 configuration, the two-piece brace 60 is forced apart at connection 44 as hereinbefore described, and the shel 36 is pivoted upward in the direction of arrowhead 90 against or adjacent the left and right tubular members 12. The handles 24 are then rotated in the direction of arrowhead 92 with the locks held in a released position against normal bias. The brackets are pivoted toward each other and locked as shown in FIGS. 2 and 3; the cart is now in a FIG. 2 configuration; the handle end of upper portion 14 of side members 12 are now pivoted about their pivot connection to the "U" shaped connector 18 to the FIG. 3 configuration.

It should be understood that the rotation of the handles and wheels from their FIG. 1 to their FIG. 2 positions likewise rotates the "U" shaped connector to a position wherein the opening is forward and no longer a lock, thereby allowing the upper and lower portions 12,14 to rotate and fold, one toward the other, to the FIG. 3 configuration. The cart is now collapsed or folded for storage or transport. To return the collapsed or folded cart to its FIG. 1 configuration, a reverse procedure is performed.

It should be understood that the specific set-up sequence above discussed may be varied according to the person collapsing or uncollapsing the device.

The structural and functional characteristics of the preferred form of the invention set forth are those that are considered important from the standpoint of simplicity of design, ease of use, and economy of construction. Other advantages and features of the invention, together with various modifications in construction, will undoubtedly occur to those skilled in the art. It is not desired that the invention be limited to the precise details of construction and use disclosed.

What is claimed is:

1. An improved collapsible hand truck comprising:
    a pair of side-by-side, spaced-apart, segmented, upright members, each of the segments of each upright member are pivotally attached in a spaced-apart relationship to a common "U" bracket and each upright comprises a handle member formed on one end thereof, extending at an angle therefrom and a wheel rotatably attached near the end remote from said handle member and extending therefrom in a direction of the distal end of said handle member, whereby said handle member and wheel lie along a common plane and the open portion of said "U" bracket is perpendicular to said common plane;

a load-carrying bracket positioned between and rotatably attached to the upright members adjacent the handle member end thereof;

a weight support shelf member rotatably attached to the upright members at their wheel adjacent ends;

brace members extending between said upright members intermediate said common "U" bracket and said wheels, said upright members are rotatable relative thereto; and a pair of levers pivotally interconnected intermediate their ends, each of said levers being pivotally attached at one end to said brace members and at their opposite end to said weight support shelf member intermediate the upright member attachment and its opposite outer end surface.

2. The invention as defined in claim 1 additionally comprising a pair of brackets at least one rotatably attached at a fixed location to each of said upright members intermediate said load carrying bracket and said "U" bracket for rotation relative to said common plane.

3. The invention as defined in claim 2 wherein the upper surface of each bracket of said pair of brackets includes an elongated member for nesting therewith, said elongated member is pivotally attached to the distal end of an upper surface bracket whereby the elongated members distal end is free to rotate with respect to the upper surface of its associated bracket.

4. The invention as defined in claims 2 and 3 further comprising a first locking means for locking said pair of brackets in a first position parallel to said handle members and wheels and in a second position perpendicular thereto.

5. The invention as defined in claim 1 further comprising locking means for locking the rotation of said upright members with respect to said load-carrying bracket, brace members and weight-supporting shelf.

6. The invention as defined in claim 1 additionally comprising means for attaching elongated pole members to said upright members.

7. The invention as defined in claim 2 additionally comprising locking means for locking the pivotly interconnected levers in their maximum extended position.

8. The invention as defined in claim 3 wherein a soft container is positioned between said pair of brackets in an open condition and locked thereto by said elongated member.

9. The invention as defined in claim 1 wherein said "U" bracket locks the segments of said upright members in their extended position when rotated to a first position and allows said segments to pivot toward each other when rotated to a second position.

* * * * *